United States Patent [19]

Obrecht et al.

[11] Patent Number: 4,916,932

[45] Date of Patent: Apr. 17, 1990

[54] FORCE MULTIPLYING PRESS

[75] Inventors: Robert E. Obrecht, Bloomfield Hills; Edward J. Waltonen, Southfield, both of Mich.

[73] Assignee: Lamb Robo, Inc., Bloomfield Hills, Mich.

[21] Appl. No.: 204,249

[22] Filed: Jun. 9, 1988

[51] Int. Cl.$^4$ ............................................... B21J 9/18
[52] U.S. Cl. ........................................ 72/450; 72/451; 100/281; 83/630
[58] Field of Search .................. 72/450, 451; 83/630; 100/280, 281, 286

[56] References Cited

U.S. PATENT DOCUMENTS

| | | | |
|---|---|---|---|
| 1,511,214 | 10/1924 | Beyer | 72/451 |
| 2,562,044 | 7/1951 | Klocke | 83/630 |
| 2,633,765 | 4/1953 | Glasner | 72/451 |
| 3,842,651 | 10/1974 | Shaffer | 72/451 |
| 3,859,708 | 1/1975 | Keim | 72/451 |
| 3,926,033 | 12/1975 | Forichon | 72/451 |
| 4,013,003 | 3/1977 | Finsterwalder et al. | 100/286 |
| 4,140,001 | 2/1979 | Moulton | 72/451 |
| 4,148,137 | 4/1979 | Kindig | 72/451 |
| 4,302,961 | 12/1981 | Leinhaas | 72/451 |
| 4,393,684 | 7/1983 | Hansen et al. | 72/451 |
| 4,434,646 | 3/1984 | Maeda et al. | 72/451 |
| 4,448,119 | 5/1984 | Williamson | 72/451 |
| 4,449,421 | 5/1984 | Olschewski et al. | 72/450 |
| 4,555,928 | 12/1985 | Hansen | 72/451 |
| 4,571,981 | 2/1986 | Miller | 72/451 |
| 4,664,004 | 5/1987 | Randall | 83/630 |
| 4,685,367 | 8/1987 | Lash et al. | 83/630 |

FOREIGN PATENT DOCUMENTS

| | | | |
|---|---|---|---|
| 2949640 | 1/1981 | Fed. Rep. of Germany | 72/450 |
| 0400529 | 7/1909 | France | 72/450 |
| 1440420 | 6/1976 | United Kingdom | 72/450 |

Primary Examiner—David Jones
Attorney, Agent, or Firm—Krass and Young

[57] ABSTRACT

A press for performing a work operation on a workpiece including a yoke defining a central bore, a ram mounted for reciprocal movement in the bore and carrying a fabricating tool on one end of the ram, an air cylinder secured to an end wall of the yoke and having a piston rod passing through the end wall of the yoke into the bore, and a force multiplying mechanism interconnecting the free end of the piston rod and the ram and operative to move the ram to a working position and thereafter multiply the force applied to the ram to facilitate the performance of the work operation. The force multiplying mechanism includes a linkage system interconnecting the free end of the piston rod and the ram and including a final link which moves into a position in proximity to the line of action of the ram as the fabricating tool reaches its working position so that subsequent movement of the link toward the line of action has the effect of multiplying the force exerted on the ram and thereby on the fabricating tool carried by the ram.

21 Claims, 6 Drawing Sheets

FORCE MULTIPLYING PRESS

BACKGROUND OF THE INVENTION

This invention relates to presses and more particularly to presses for performing a work operation on a workpiece.

Presses are commonly used in our industrial society for a myriad of mechanical fabricating operations such as piercing, punching, shape forming, resistance welding or the like. Various presses have been proposed and utilized to perform the various mechanical fabricating operations with the particular form and configuration of the press generally dictated by the particular application envisioned. Whereas a multitude of press designs have been proposed and in some cases commercially exploited, all of the prior art presses have had certain disadvantages. Generally, presses in which a large force is required to perform the desired fabrication operation have tended to be unduly large and cumbersome and, conversely, smaller, less cumbersome presses are unsatisfactory where a large force is required to perform the desired fabrication operation.

Various attempts have been made to provide a relatively small press capable of generating a relatively high force at the fabricating tool but the commercial application of these presses has been limited by problems related to leakage, durability and the like.

SUMMARY OF THE INVENTION

This invention is directed to the provision of a relatively small press capable of generating relatively large fabricating forces.

The invention press is usable in performing a work operation on a workpiece such for example as piercing, punching, shape forming or welding. The press of the invention includes a frame defining a bore; a ram slidably mounted in the bore and having a first end positioned within the bore and a free end projecting out of the bore; a fabricating tool mounted on the ram free end; a motor including an output shaft powered in response to actuation of the motor and a drive member carried by the output shaft and movable through power and return strokes in response to powering of the output shaft; and a force multiplying mechanism interconnecting the drive member and the ram and operative in response to power stroking movement of the drive member to move the fabricating tool to a working position and thereafter multiply the force applied to the tool to facilitate the performance of the work operation. This arrangement allows a relatively small press to generate a relatively large force at the fabricating tool.

According to a further feature of the invention, the ram and the drive member are mounted for movement on parallel axes so that forward stroking movement of the drive member produces forward stroking movement of the ram and the force multiplying mechanism comprises a linkage system interconnecting the drive member and the ram and transmitting the forward stroking movement of the driver member to the ram. This arrangement provides a convenient and efficient means for effecting the force multiplying function.

According to a further feature of the invention, the linkage system includes a first link connected at one end thereof to a connection point on the ram and movable in response to forward stroking movement of the piston from a rest position, in which the other end thereof is displaced from a line of action parallel to the axes of the ram and drive member and passing through the connection point on the ram, to a working position in which the other end of the link is proximate the line of action. This arrangement provides a ready and efficient means of multiplying the force applied to the ram as the link approaches the line of action.

According to a further feature of the invention, the linkage system further includes a second link pivoted at a first point thereon about an axis positioned on the line of action and fixed with respect to the frame and pivotally connected at a second point thereon to the other end of the first link. This arrangement provides a convenient means of transmitting the force from the drive member to the force multiplying link.

According to a further feature of the invention, the linkage system further includes a third link pivoted at one end thereof to the drive member and pivoted at the other end thereof to a third point on the second link. This arrangement further facilitates the transmittal of motion and power from the drive member to the force multiplying link.

According to a further feature of the invention, the first, second and third points on the second link are triangulated. This specific geometric configuration further optimizes the efficiency of the linkage system.

According to a further feature of the invention, the second link has a triangular configuration with the first, second and third points positioned respectively at the three corners thereof.

According to a further feature of the invention, the motor comprises a power cylinder including a piston and a piston rod; the output shaft of the press is constituted by the piston rod of the power cylinder; and the drive member is mounted on the free end of the piston rod. This arrangement provides a convenient and efficient means of utilizing a power cylinder of known construction and performance.

According to a further feature of the invention, the power cylinder is an air cylinder. This specific arrangement allows a relatively low pressure air cylinder to be utilized to generate a relatively high force at the fabricating tool.

According to a further feature of the invention, the centerline of the bore of the frame, the centerline of the power cylinder, and the line of action all lie on a common axis. This specific geometric arrangement maximizes the ability of the invention press to efficiently and effectively transmit force from the lower cylinder to the fabricating tool mounted on the ram.

In the disclosed embodiment of the invention, the bore defined in the frame is open at one end and closed at its other end by an end wall of the frame; the ram is slidably mounted in the bore with a first end positioned in the bore in proximity to the end wall of the frame and a second free end projecting out of the bore; the motor is mounted on the end wall of the frame exteriorally of the frame and includes an output shaft extending through the end wall and into the bore; the drive member is carried on the free end of the output shaft of the motor and movable through power and return strokes in response to powering of the output shaft upon actuation of the motor; and the force multiplying mechanism is positioned within the bore in mechanically interconnecting relation to the drive member on the output shaft and the ram. This specific arrangement provides a compact package for the press to facilitate the desired movement of the ram and the desired force multiplying effect as the ram arrives at its operating position.

DETAILED DESCRIPTION O THE PREFERRED EMBODIMENT

The invention press, broadly considered, comprises a yoke or frame 10, a ram 12, an air cylinder assembly 14, a drive member 16, a force multiplying mechanism 18, first and second fabricating tools 20 and 22, and a base 24.

Figure 6:
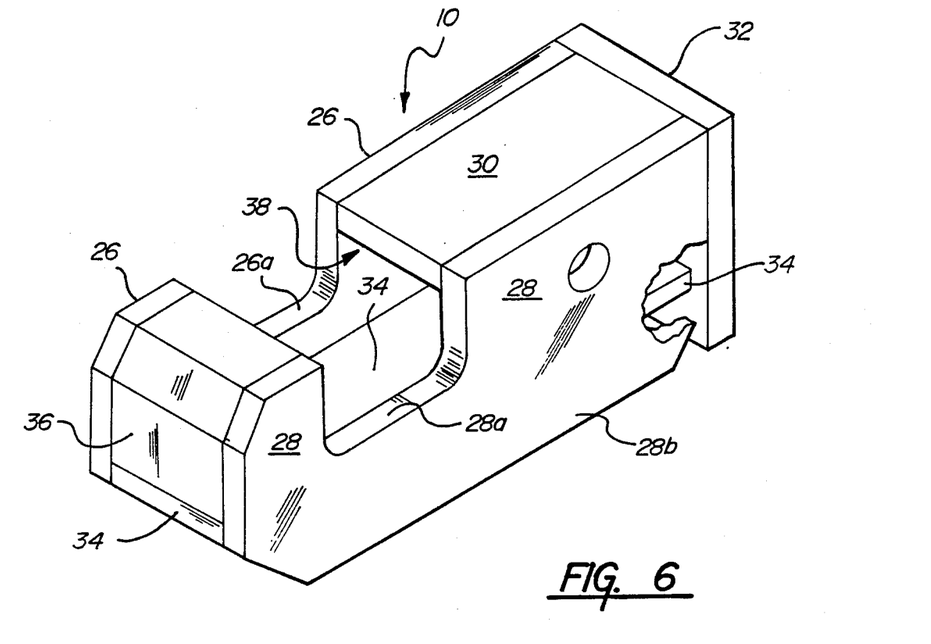
FIG. 6 is a perspective view of the frame or yoke of the invention press.

Yoke 10 is formed of steel plates and has a cage configuration with a generally C-shape in longitudinal cross section. Yoke 10 includes generally C-shaped side plates 26 and 28, a top plate 30, an end plate 32, a bottom plate 34, and a die retainer plate 36. Plates 26, 28, 30, 32, 34 and 36 are suitably joined together, as for example by bolting, to form a C-shaped cage structure defining a generally rectangular blind bore 38 opening adjacent the forward end of the yoke and closed at its rearward end by rear end plate 32. Side plates 26 and 28 will be seen to include cutouts 26a and 28a defining the C-configuration of the plates and will be seen to extend downwardly below bottom plate 34 to form skirt portions 26b and 28b.

Figure 7:
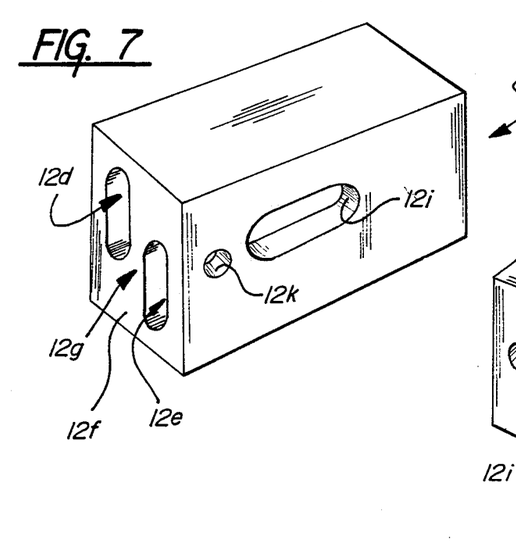
FIGS. 7 and 8 are perspective views of the ram of the invention press.
Figure 8:
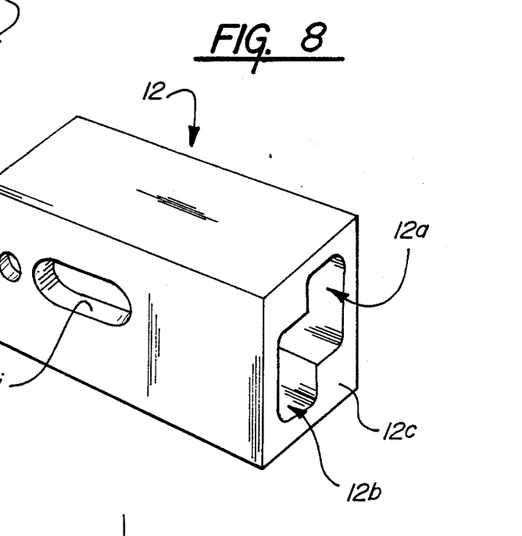

Ram 12 is formed as a monolithic rectangular steel block with a cross sectional configuration conforming to the cross-sectional configuration of bore 38 so that ram 12 may reciprocate smoothly within bore 38. Ram 2 is selectively hollowed out along its length to provide parallel core passages 12a and 12b opening at the rear face 12c of the ram and parallel core passages 12d and 12e opening at the front face 12f of the ram. Core passages 12a and 12b are transversely overlapping so as to form a compound joint passage, and core passages 12d and 12e are transversely spaced and separated by a central partition portion 12g of the ram. The rearward ends of core passages 12d and 12e communicate respectively with the forward ends of the core passages 12a and 12b so that passages 12e and 12b combine to form a continuous passage extending from front to rear of the ram and passages 12d and 12a similarly combine to form a second continuous passage extending from front to rear of the ram. Ram 12 further includes longitudinally extending slots 12h and 12i formed in the respective side walls of the ram. Slot 12h communicates at its inner end with core chamber 12a and slot 12i communicates at its inner end with core chamber 12b.

Figures 1, 11, 12:
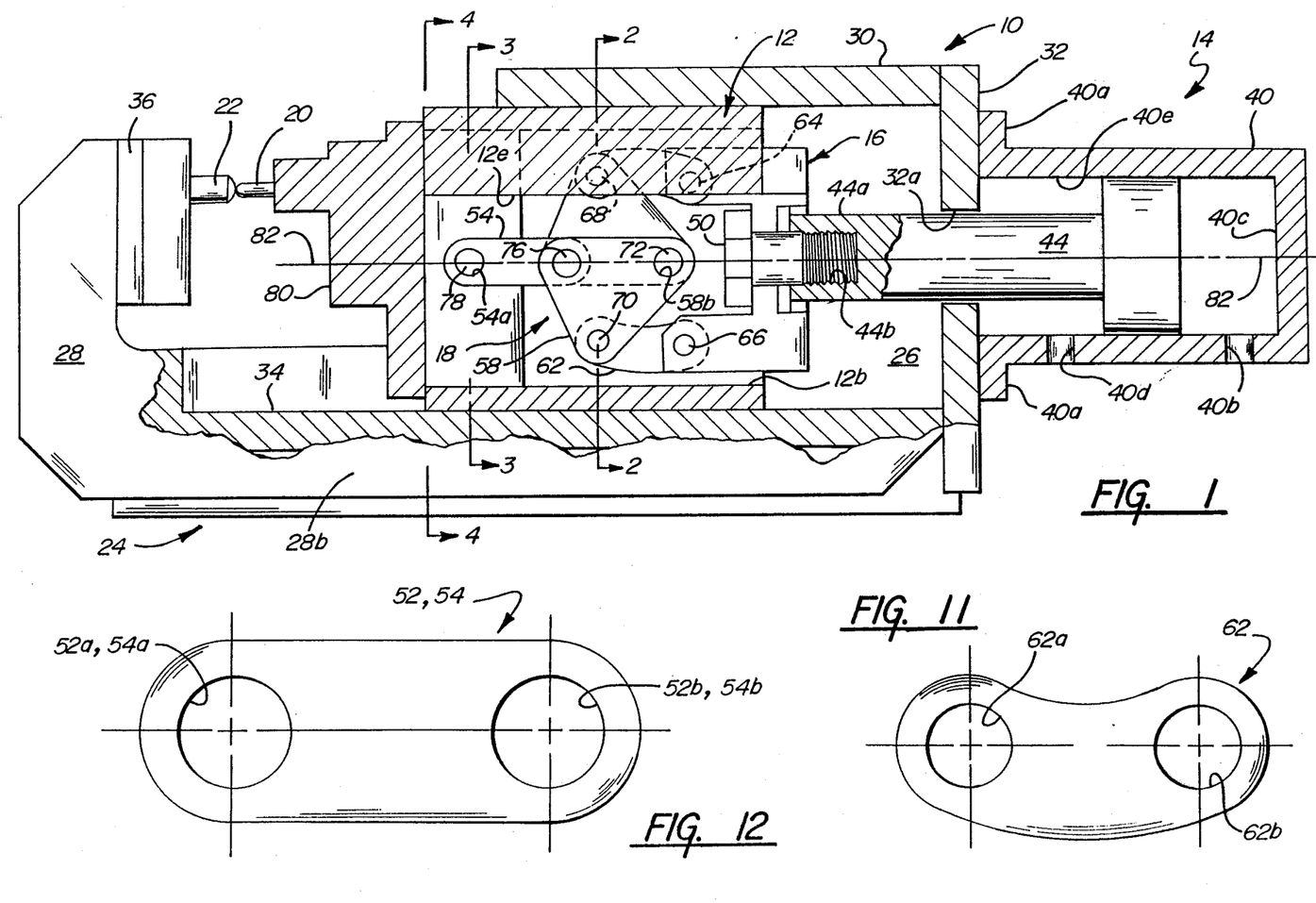
FIG. 1 is a longitudinal cross-sectional view of a press according to the invention.
FIG. 11 is an elevational view of a further link used in the invention force multiplying mechanism.
FIG. 12 is an elevational view of a still further link used in the invention force multiplying mechanism.
Figure 2:
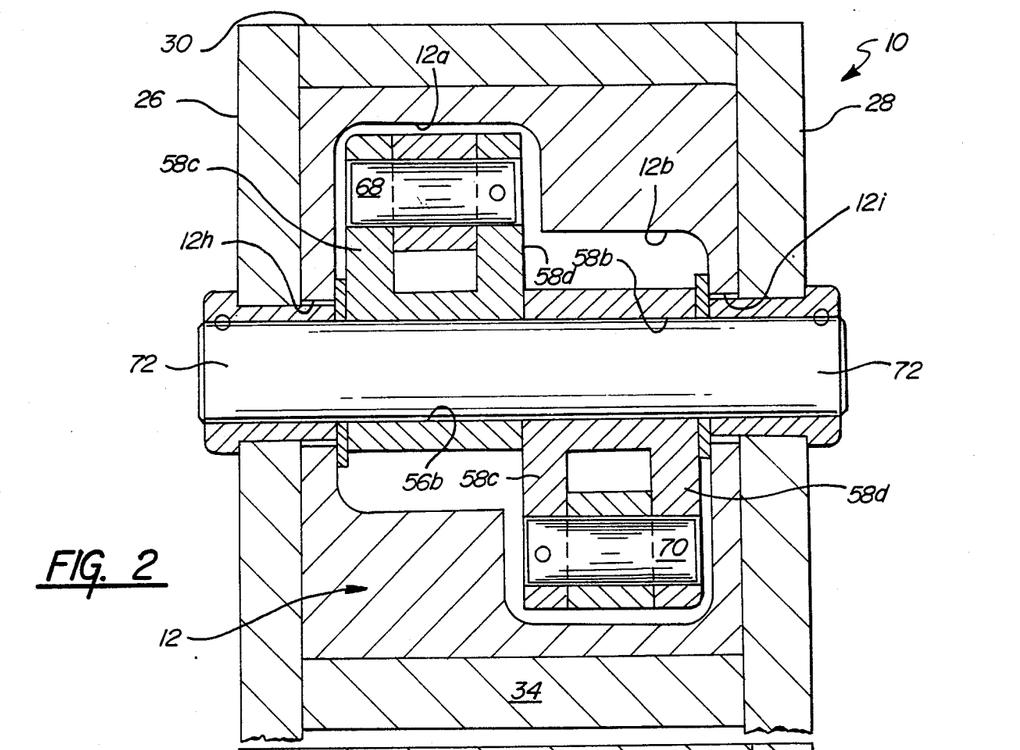
FIGS. 2, 3 and 4 are transverse cross-sectional views taken on line 2—2, 3—3 and 4—4 of FIG. 1.
Figure 3:
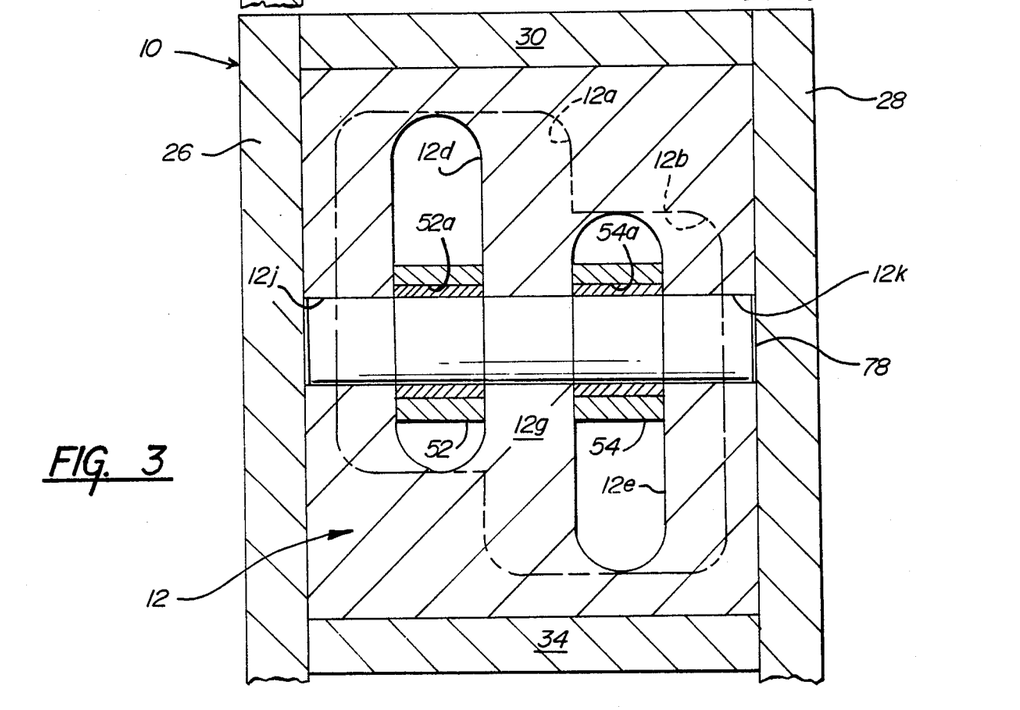
Figure 4:
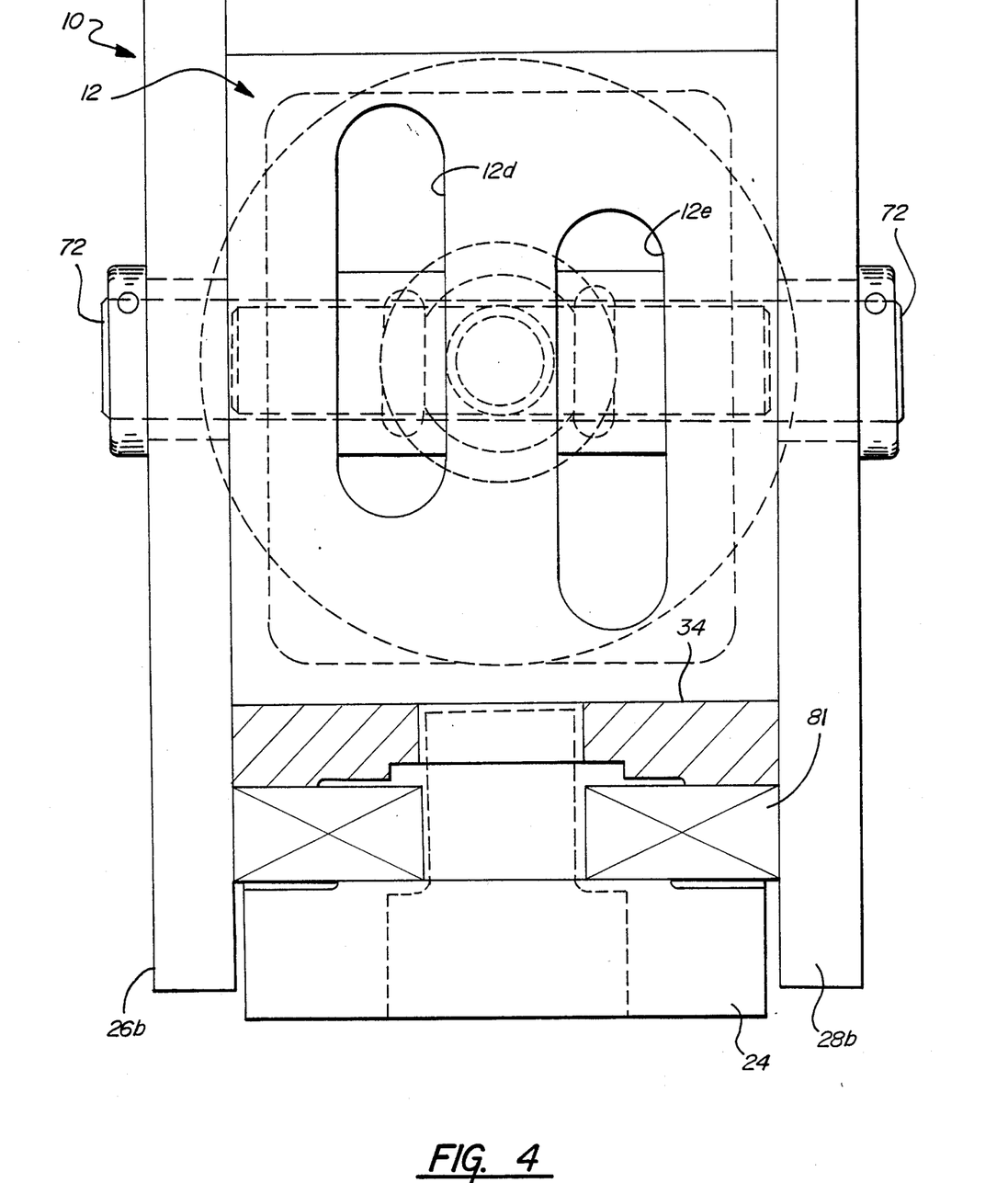

Air cylinder assembly 14 is of known form and includes a cylindrical housing 40, a piston 42, and a piston rod 44 secured to piston 42. Housing 40 includes a flange portion 40a to facilitate securement of housing 40 to yoke end plate 32 such, for example, as by bolting, in a position in which the centerline of the housing 40 is coaxial with the centerline of bore 38. Piston rod 44 extends forwardly from piston 42 and passes through an aperture 32a in yoke end plate 32 to dispose the free forward end of the piston rod 44a within bore 38. A suitable port 40b in housing 40 allows the admission of pressurized air to pressure chamber 40c to provide forward stroking movement of piston 42 and piston rod 44 in known manner, and a further port 40d in housing 40 allows the admission of pressurized fluid to chamber 40e to provide return stroking movement of piston 42 and piston rod 44, also in known manner.

Drive member 16 is formed as a steel casting and is adapted to be secured to the free forward end 44a of piston rod 44 so as to position drive member 16 within bore 38 of ram 10. Drive member 16 is sized to be slidably received in the rear ends of core passages 12a and 12b of ram 12 at the forward extreme of the forward stroking movement of piston rod 44. Drive member 16 includes a rear plate portion 16a; an upper plate portion 16b extending forwardly from the upper edge portion of rear plate 16a; a lower plate portion 16c extending forwardly from the lower edge portion of rear plate portion 16a in vertically spaced relation to upper plate portion 16b; a first clevis portion 16d positioned at one side of and extending downwardly from bottom plate 16c: and a further clevis portion 16e provided at one side and extending upwardly from upper plate portion 16b. Clevis portions 16d and 16e are at opposite sides of drive member 16 so as to be respectively received in core passages 12b and 12a during the forward stroking movement of the piston rod 44. Drive member 16 is secured to the free 44a of piston rod 44 by a bolt 50 passing rearwardly through a bore 16f in rear plate portion 16a of drive member 16 for threaded coaction with a threaded bore 44b opening in the forward end of piston rod 44.

Figure 5:
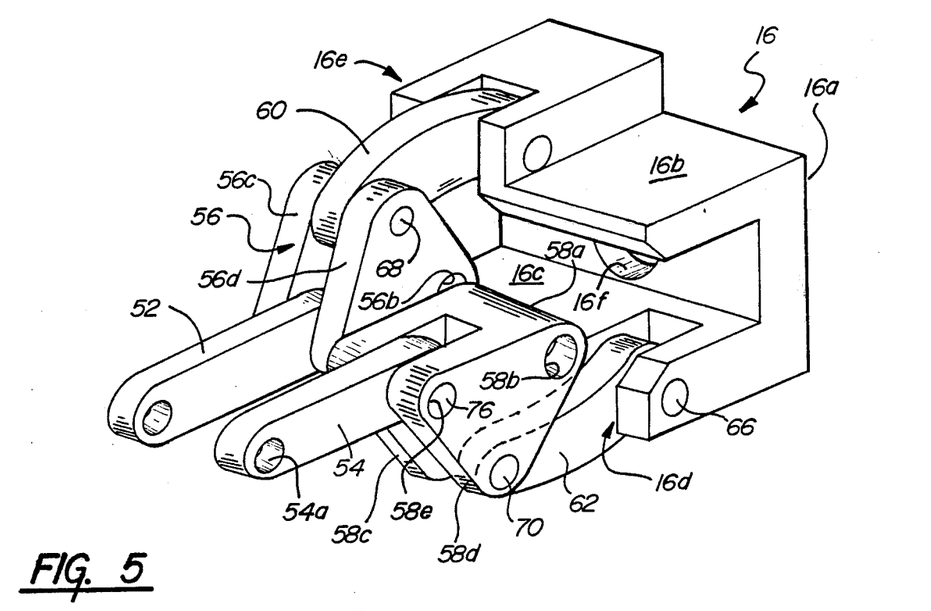
FIG. 5 is a perspective view, partially in phantom, of the invention force multiplying mechanism.

Force multiplying mechanism 18 includes a first pair of links 52 and 54, a second pair of links 56 and 58, and a third pair of links 60 and 62. Links 52, 56 and 60 are pivotally joined together to form a first linkage system for coaction With clevis portion 16e of drive member 16 and links 54, 58 and 62 are pivotally joined together to form a second linkage system for coaction with clevis portion 16d of drive member 16.

Links 52 and 54 are generally straight and elongated and include a forward aperture 52a, 54a and a rearward aperture 52b, 54b.

Figure 9:
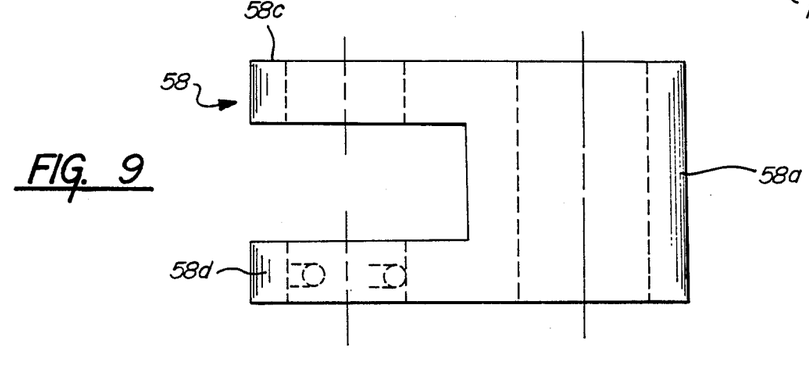
FIGS. 9 and 10 are plan and elevational views, respectively, of a link used in the invention force multiplying mechanism.
Figure 10:
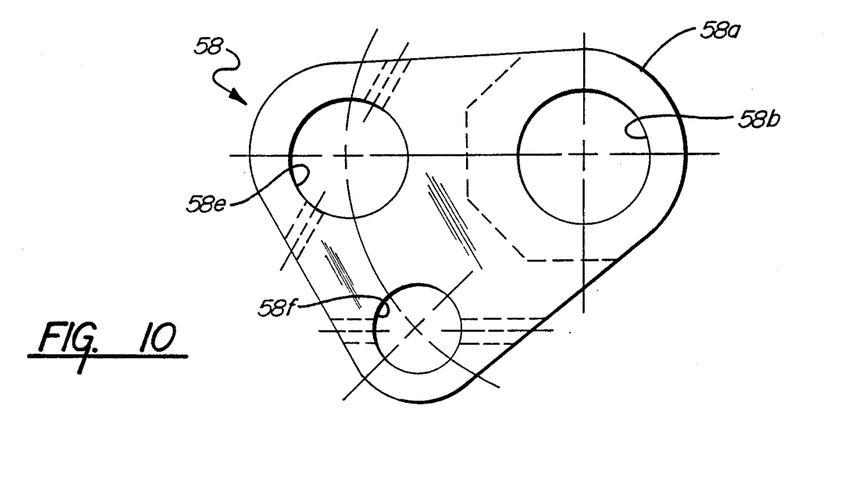

Links 56 and 58 are identical and will be described with reference to link 58 as shown in FIGS. 9 and 10. Link 58 is triangular and includes solid rearward portion 58a defining an aperture 58b and a bifurcated forward portion defined by spaced arm portions 58c and 58d. Aligned apertures 58e are provided in the upper corner of arm portions 58c, 58d and aligned apertures 58f are provided in the lower corner of spaced arm portions 58c, 58d so that link 58 presents a triangular configuration with apertures at each corner of the triangle. At noted, link 56 is identical to link 58 although employed in the force multiplying mechanism 18 in an inverted disposition relative to link 58.

Links 60 and 62 are identical and elongated, have a bowed configuration between their ends, and define a forward aperture 60a, 62a and a rearward aperture 60b, 62b.

In the assembled relation of the force multiplying mechanism 18, the rearward ends of links 60 and 62 are respectively positioned within clevises 16e and 16d of drive member 16 with pivot pins 64 and 66 respectively passing through apertures 60b, 62b to pivotally secure the rear ends of links 60, 62 to clevises 16e, 16d, respectively with link 60 in a convexly bowed disposition and link 62 in a concavely bowed disposition; the forward ends of links 60, 62 are pivotally secured by pivot pins 68, 70 to apertures 56f, 58f of links 56, 58 with the forward end of the link positioned in each case between the arm portions 56c, 56d and 58c, 58d of the respective links 56, 58; apertures 56b, 58b of links 56, 58 journally receive a fixed pin 72 fixedly secured at its opposite ends to side plates 26, 28 of yoke 10 and passing through slots 12h and 12i and passages 12a and 12b in ram 12; the rear ends of links 52, 54 are pivotally secured by pivot pins 74, 76 to apertures 56e, 58e of links 56, 58 with the rear end of the link positioned in each case between the arm portions 56c, 56d and 58c, 58d of the respective links 56, 58; and the forward ends of links 52, 54 are respectively positioned in core passages 12d, 12e and journaled on a pin 78 received at its opposite ends in apertures 12j and 12k in the opposite side walls of ram 12 and passing intermediate its ends through core passage 12d, partition portion 12g, and core passage 12e. It will be seen that linkage system 52, 56 and 60, together with drive member clevis 60e, is generally disposed in the continuous passage defined by core passages 12a and 12d and linkage system 54, 58 and 62, together with drive ember clevis portion 16d, is generally disposed in the continuous passage defined by core passages 12b and 12e with linkage system 52, 56, 60 occupying a generally upper position with respect to the overall force multiplying mechanism and linkage system 54, 58, 62 occupying a generally lower disposition with respect to the overall force multiplying mechanism.

Fabricating tool 20, which may comprise for example a punch, is mounted on an adapter member 80 suitably secured to the forward end of ram 12 in overlying relation to core passages 12d and 12e, and fabricating tool 22, which may comprise for example a collet, is suitably secured to the rearward end of die retainer plate 36 in aligned relation to punch 20 so as to coact with punch 20 to perform a punching operation on a workpiece positioned therebetween in response to actuation of air motor 40.

Yoke 10 is suitably mounted on base member 24 for reciprocal movement relative to the base member with linear bearings 81 interposed between base 24 and the lower face of yoke bottom plate 34 to facilitate the smooth reciprocal movement of yoke 10 on base so that the invention press may operate in a self-equalizing manner upon actuation of air motor 40 to apply equal forces to the opposite sides of a workpiece positioned between fabricating tools 20 and 22 to avoid undesirable inelastic deformation cf the workpiece during the work operation performed by the fabricating tools 20 and 22. Further details of the manner in which yoke 12 may be mounted on base 24, as well as further details of the manner in which the yoke 10 coacts with the base 24 to facilitate a self-equalizing work operation, are disclosed in U.S. Pat. No. 4,716,803, assigned to the assignee of the present application as well as in U.S. patent application Ser. No. 859,016 filed on May 2, 1986 and also assigned to the assignee of the present application.

Figure 13:
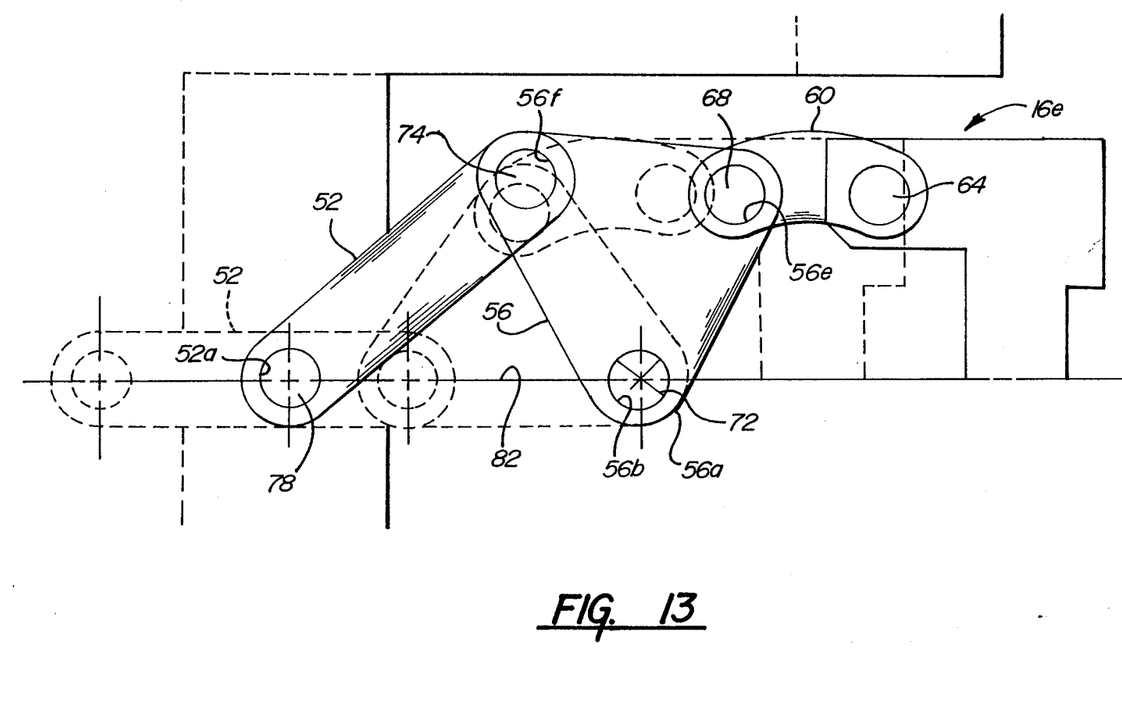
FIG. 13 is a somewhat schematic view illustrating the operation of the invention force multiplying mechanism.

In the operation of the invention press, the force multiplying mechanism, in response to the forward stroking movement of air cylinder 40, moves from the solid line position seen in FIG. 13 to the dotted line position seen in FIG. 13. The initial forward stroking movement of the force multiplying mechanism, and the vast majority of the forward stroking movement, accomplishes a gross movement of the fabricating tool 20 into a working position relative to fabricating tool 22 and relative to a workpiece positioned therebetween, and the final forward stroking movement of the force multiplying mechanism acts to multiple the force supplied to the fabricating tool to facilitate the performance of the work operation. Specifically, and with reference to the linkage system 52, 56, and 60 seen in FIG. 13, with the system in its return or retracted position, triangular link 56 is at a disposition such that pin 72 passes through the aperture 56b in the lower corner of the link, the aperture 56e is disposed in an upper and rearward disposition for pivotal receipt of the forward end of link 60, and the aperture 56f is disposed in an upper and forward disposition for pivotal receipt of the rear end of link 52. The rear end of link 52 is thus disposed in a grossly displaced disposition relative to the line of action 82 passing through pins 78 and 72. Line of action 82 will also be seen to be in coaxial alignment with the centerlines of bore 38 and air cylinder housing 40 so that line of action 82 also defines the centerlines of bore 38 and cylinder 40. As the press begins its forward stroking movement in response to actuation of air cylinder 40, triangular link 56 pivots downwardly about the axis of fixed pin 72 so that link 52 is moved forwardly in a manner to move the ram forwardly through the intermediary of pin 78 and thereby move the fabricating tool 20 to its working position. The various parts are configured and designed such that the tool 20 arrives at its working position relative to the workpiece and relative to fabricating tool 22 at such time as link 52 assumes an approximately 7° angular disposition with respect to line cf action 82. Further forward stroking movement of the press has the effect of multiplying the force exerted at the tool 20 as the center of pivot pin 74 moves closer and closer to the line of action 82. Preferably, the center of pin 74 never quite reaches the line of action 82 but rather has a final disposition in which link 52 assumes an approximately 1° angular disposition with respect to line of action 82. The force applied to tool 20 and thereby to the workpiece is thereby multiplied by a factor of approximately 30 times so that the relatively small magnitude air pressure force applied against the piston 52 in chamber 40c has the effect of applying an extremely large force at the tool 20 to perform even extremely heavy-duty fabricating operations. It will of course be understood that, although the operation of the force multiplying mechanism has been described in FIG. 13 with respect to the linkage system 52, 56 and 60, a similar force multiplying action occurs with respect to linkage system 54, 58 and 62 as the drive member 16 is moved through its forward stroking movement so that link 52 approaches the line of action 82 from an upper disposition and link 54 approaches line of action 82 from a lower disposition in response to actuation of the press to provide a balancing of the forces generated during the forward stroking movement. As indicated, the invention press is preferably arranged and designed to operate in a self-equalizing manner so that the forces exerted on the workpiece by fabricating tools 20 and 22 are essentially equal but the invention press may also be operated without the force equalizing feature.

The invention press will be seen to provide a compact and efficient mechanism for applying a large force to a fabricating tool to perform even heavy-duty work operations while requiring only a relatively small and readily available energy input at the actuation end of the press. For example, the invention press may be designed so that, with a three inch diameter piston, air pressure of 80 psi introduced into chamber 40c will result in the application of a force of 16,800 lbs. at the tool 20. The in-line disposition of the centerlines of cylinder 40 and bore 38, as well as the coincidence of the line of action 82 with these centerlines, facilitates the smooth and effective operation of the invention press and also minimizes sealing problems that have plagued similar prior art designs.

Whereas a preferred embodiment of the invention has been illustrated and described in detail it will be apparent that various changes may be made in the disclosed embodiment without departing from the scope or spirit of the invention.

We claim:

1. A press for performing a work operation on a workpiece, said workpiece comprising:
    (A) a frame defining a bore having a central axis;
    (B) a ram slidably mounted in said bore and having an axially extending circumferential surface of constant diameter slidably engaging said bore so as to constrain said ram for sliding movement in said bore in a direction parallel to said axis, said ram having a first end positioned within said bore and a free end projecting out of said bore;
    (C) a first fabricating tool mounted on said ram free end;
    (D) a motor including an output shaft powered in response to actuation of said motor and a drive member carried by said output shaft and reciprocably movable in a straight line through power and return strokes in response to powering of said output shaft; and
    (E) a force multiplying mechanism interconnecting said drive member and said ram and operative in response to straight line power stroking movement of said drive member to move said fabricating tool to a working position and thereafter multiply the force applied to said tool to facilitate the performance of the work operation.

2. A press according to claim 1 wherein:
    (E) said ram and said drive member are mounted such that forward stroking movement of said drive member produces forward stroking movement of said ram; and
    (F) said force multiplying mechanism comprises a linkage system interconnecting said drive member and said ram and transmitting the forward stroking movement of said drive member to said ram.

3. A press according to claim 2 wherein:
    (G) said linkage system includes a first link connected at one end thereof to a connection point on said ram and reciprocably movable in response to reciprocable stroking movement of said drive member between a rest position in which the other end thereof is displaced from a line of action parallel to said axes and passing through said connection point and a working position in which said other end thereof is proximate said line of action.

4. A press according to claim 3 wherein:
    (H) said linkage system further includes a second link pivoted at a first point thereon about an axis positioned on said line of action and fixed with respect to said frame end pivotally connected at a second point thereon to said other end of said first link.

5. A press according to claim 1 wherein:
    (F) said rotor comprises a power cylinder including a piston and a piston rod;
    (G) said output shaft comprises the piston rod of said power cylinder; and
    (H) said drive member is mounted on the free end of said piston rod.

6. A press according to claim 5 wherein:
    (I) said power cylinder is an air cylinder.

7. A press according to claim 5 wherein:
    (I) the centerline of said bore and the centerline of said cylinder lie on a common axis.

8. A press for performing a work operation on a workpiece, said press comprising:
    (A) a frame defining a bore;
    (B) a ram slidably mounted in said bore and having a first end positioned within said bore and a free end projecting out of said bore;
    (C) a first fabricating tool mounted on said ram free end;
    (D) a motor including an output shaft powered in response to actuation of said motor and a drive member carried by said output shaft and movable through power and return strokes in response to powering of said output shaft; and
    (E) a force multiplying mechanism interconnecting said drive member and said ram and operative in response to power stroking movement of said drive member to move said fabricating tool to a working position and thereafter multiply the force applied to said tool to facilitate the performance of the work operation;
    (F) said ram and said drive member being mounted for movement on parallel axes so that forward stroking movement of said drive member produces forward stroking movement of said ram;
    (G) said force multiplying mechanism comprising a linkage system interconnecting said drive member and said ram and transmitting the forward stroking movement of said drive member to said ram;
    (H) said linkage system including a first link connected at one end thereof to a connection point on said ramp and movable in response to forward stroking movement of said piston from a rest position in which the other end thereof is displaced from a line of action parallel to said axes and passing through said connection point to a working position in which said other end thereof is proximate said line of action;
    (I) said linkage system further including a second link pivoted at a first point thereon about an axis positioned on said line of action and fixed with respect to said frame and pivotally connected at a second point thereon to said other end of said first link; and
    (J) said linkage system further including a third link pivoted at one end thereof to said drive member and pivoted at the other end thereof to a third point on said second link.

9. A press according to claim 8 wherein:
    (K) said first, second and third points on said second link are triangulated.

10. A press according to claim 9 wherein:

(K) said second link has a triangular configuration with said first, second and third points positioned respectively at the three corners thereof.

11. A press for performing a work operation on a workpiece, said workpiece comprising:
(A) a yoke defining a bore having a central axis, said bore being open at one end and closed at its other end by an end wall of said yoke;
(B) a ram slidably mounted in said bore and having an axially extending circumferential surface of constant diameter slidably engaging said bore so as to constrain said ram for sliding movement in said bore in a direction parallel to said axis, said ram having a first end positioned within said bore and a second, free end projecting out of said bore;
(C) a fabricating tool mounted on the free end of said ram;
(D) a motor mounted on said end wall exteriorally of said yoke and including an output shaft extending through said end wall and into said bore;
(E) a drive member carried on the free end of said output shaft and reciprocally movable in a straight line through power and return strokes in response to powering of said output shaft upon actuation of said motor; and
(F) a force multiplying mechanism interconnecting said drive member and said ram and operative in response to power stroking movement of said drive member to move said fabricating tool to a working position and thereafter multiply the force applied to said fabricating tool to facilitate the performance of the work operation.

12. A press for performing a work operation on a workpiece, said press comprising:
(A) a yoke defining a bore having a central axis, said bore being open at one end and closed at its other end by an end wall of said yoke;
(B) a ram slidably mounted in said bore and having an axially extending circumferential surface of constant diameter slidably engaging said bore so as to constrain said ram for sliding movement in said bore in a direction parallel to said axis, said ram having a first end positioned within said bore and a second, free end projecting out of said bore;
(C) a first fabricating tool mounted on the free end of said ram;
(D) a motor mounted on said end wall exteriorally of said yoke and including an output shaft extending through said end wall and into said bore;
(E) a drive member carried on the free end of said output shaft and movable through power and return strokes in response to powering of said output shaft upon actuation of said motor; and
(F) a force multiplying mechanism interconnecting said drive member and said ram and operative in response to power stroking movement of said drive member to move said fabricating tool to a working position and thereafter multiply the force applied to said tool to facilitate the performance of the work operation;
(G) said ram and said drive member being mounted for movement on parallel axes so that forward stroking movement of said ram; and
(H) said force multiplying mechanism comprising a linkage system interconnecting said drive member and said ram and transmitting the forward stroking movement of said drive member to said ram.

13. A press according to claim 12 wherein:
(I) said linkage system includes a first link connected at one end thereof to a connection point on said ram and movable in response to forward stroking movement of said drive member from a rest position, in which the other end thereof is displaced from a line of action parallel to said axes and passing through said connection point, to a working position in which said other end thereof is proximate said line of action.

14. A press according to claim 13 wherein:
(J) said linkage system further includes a second link pivoted at a first point thereon about an axis positioned on said line of action and fixed with respect to said yoke and pivotally connected at a second point thereon to said other end of said first link.

15. A press for performing a work operation on a workpiece, said press comprising:
(A) a yoke defining a bore open at one end and closed at its other end by an end wall of said yoke;
(B) a ram slidably mounted in said bore with a first end positioned within said bore and a second, free end projecting out of said bore;
(C) a fabricating tool mounted on the free end of said ram;
(D) a motor mounted on said end wall exteriorally of said yoke and including an output shaft extending through said end wall and into said bore;
(E) a drive member carried on the free end of said output shaft and movable through power and return strokes in response to powering of said output shaft upon actuation of said motor;
(F) a force multiplying mechanism interconnecting said drive member and said ram and operative in response to power stroking movement of said drive member to move said fabricating tool to a working position and thereafter multiply the force applied to said fabricating tool to facilitate the performance of the work operation;
(G) said ram and said drive member being mounted for movement on parallel axes so that forward stroking movement of said drive member produces forward stroking movement of said ram;
(H) said force multiplying mechanism comprising a linkage system interconnecting said drive member and said ram and transmitting the forward stroking movement of said drive member to said ram;
(I) said linkage system including a first link connected at one end thereof to a connection point on said ram and movable in response to forward stroking movement of said drive member from a rest position, in which the other end thereof is displaced from a line of action parallel to said axes and passing through said connection point, to a working position in which said other end thereof is proximate said line of action;
(J) said linkage system further including a second link pivoted at a first point thereon about an axis positioned on said line of action and fixed with respect to said yoke and pivotally connected at a second point thereon to said other end of said first link; and
(K) said linkage system further including a third link pivoted at one end thereof to said drive member and pivoted at the other end thereof to a third point on said second link.

16. A press according to claim 15 wherein:
(L) said first, second and third points on said second link are triangulated.

17. A press according to claim 16 wherein:

(M) said second link has a triangular configuration with said first, second and third points positioned respectively at the three corners thereof.

18. A press according to claim 17 wherein:
(N) said motor is an air cylinder.

19. A press according to claim 18 wherein:
(O) the centerline of said bore and the centerline of said cylinder lie on a common axis and said line of action also lies on said common axis.

20. A press for performing a work operation on a workpiece, said press comprising:
(A) a frame defining a bore having a central axis;
(B) a ram slidably mounted in said bore and having an axially extending circumferential surface of constant diameter slidably engaging said bore so as to constrain said ram for sliding movement in said bore in a direction parallel to said axis, said ram having a first end positioned within said bore and a free end projecting out of said bore;
(C) a first fabricating tool mounted on said ram free end;
(D) a motor including an output shaft powered in response to actuation of said motor and a drive member carried by said output shaft and movable through power and return strokes in response to powering of said output shaft; and
(E) a force multiplying mechanism interconnecting said drive member and said ram and operative in response to power stroking movement of said drive member to move said fabricating tool to a working position and thereafter multiply the force applied to said tool to facilitate the performance of the work operation;
(F) said motor comprising a power cylinder including a piston and a piston rod;
(G) said output shaft comprising the piston rod of said power cylinder;
(H) said drive member being mounted on the free end of said piston rod;
(I) the centerline of said bore and the centerline of said cylinder lying on a common axis; and
(J) said press further including a base member mounting said frame member for reciprocal movement thereon.

21. A press for performing a work operation on a workpiece, said press comprising:
(A) a frame defining a bore having a central axis;
(B) a ram slidably mounted in said bore and having an axially extending circumferential surface of constant diameter slidably engaging said bore so as to constrain said ram for sliding movement in said bore in a direction parallel to said axis, said ram having a first end positioned within said bore and a free end projecting out of said bore;
(C) a first fabricating tool mounted on said ram free end;
(D) a motor including an output shaft powered in response to actuation of said motor and a drive member carried by said output shaft and movable through power and return strokes in response to powering of said output shaft; and
(E) a force multiplying mechanism interconnecting said drive member and said ram and operative in response to power stroking movement of said drive member to move said fabricating tool to a working position and thereafter multiply the force applied to said tool to facilitate the performance of the work operation;
(F) said motor comprising a power cylinder including a piston and a piston rod;
(G) said output shaft comprising the piston rod of said power cylinder;
(H) said drive member being mounted on the free end of said piston rod;
(I) the centerline of said bore and the centerline of said cylinder lying on a common axis;
(J) said frame further including a portion positioned in confronting relation to the forward stroking movement of said ram; and
(K) said press further including a second fabricating tool mounted on said frame portion in confronting alignment with aid first fabricating tool so as to coact with said first fabricating tool to perform a work operation on a workpiece positioned therebetween in response to forward stroking movement of said ram.

* * * * *